US012649372B2

(12) United States Patent
Easley et al.

(10) Patent No.: US 12,649,372 B2
(45) Date of Patent: Jun. 9, 2026

(54) GRADE-BASED VEHICLE MOTION CONTROL

(71) Applicant: Textron Innovations Inc., Providence, RI (US)

(72) Inventors: Preston Sering Easley, Evans, GA (US); Cole Elliott O'Brien, North Augusta, SC (US); Gregory August Theodosakis, Martinez, GA (US); Jonathan Daniel Bowen, North Augusta, SC (US); Christopher Boehm, North Augusta, SC (US)

(73) Assignee: Textron Innovations Inc., Providence, RI (US)

( * ) Notice: Subject to any disclaimer, the term of this patent is extended or adjusted under 35 U.S.C. 154(b) by 259 days.

(21) Appl. No.: 18/502,271

(22) Filed: Nov. 6, 2023

(65) Prior Publication Data

US 2025/0145013 A1 May 8, 2025

(51) Int. Cl.
*B60L 15/20* (2006.01)
*B60K 31/00* (2006.01)
*B60L 50/60* (2019.01)

(52) U.S. Cl.
CPC .............. *B60L 15/20* (2013.01); *B60L 50/60* (2019.02); *B60K 31/00* (2013.01); *B60L 2240/12* (2013.01); *B60L 2240/642* (2013.01)

(58) Field of Classification Search
CPC ...... B60L 15/20; B60L 50/60; B60L 2240/12; B60L 2240/642; B60K 31/00
USPC .......................................................... 701/22
See application file for complete search history.

(56) References Cited

U.S. PATENT DOCUMENTS

| | | | |
|---|---|---|---|
| 6,631,317 B2 | 10/2003 | Lu et al. |
| 6,714,851 B2 | 3/2004 | Hrovat et al. |
| 6,718,248 B2 | 4/2004 | Lu et al. |
| 6,725,140 B2 | 4/2004 | Lu et al. |
| 6,804,584 B2 | 10/2004 | Tseng et al. |
| 6,961,648 B2 | 11/2005 | Salib et al. |
| 7,010,409 B2 | 3/2006 | Lu et al. |
| 7,079,928 B2 | 7/2006 | Lu et al. |
| 7,092,808 B2 | 8/2006 | Lu et al. |
| 7,191,047 B2 | 3/2007 | Chen et al. |
| 7,194,351 B2 | 3/2007 | Lu et al. |
| 7,222,007 B2 | 5/2007 | Xu et al. |
| 7,321,825 B2 | 1/2008 | Ranalli |
| 7,366,602 B2 | 4/2008 | Xu et al. |
| 7,480,547 B2 | 1/2009 | Brown et al. |

(Continued)

FOREIGN PATENT DOCUMENTS

| | | |
|---|---|---|
| CN | 112172789 B | 7/2021 |
| CN | 111231936 B | 8/2021 |

(Continued)

*Primary Examiner* — Luis A Martinez Borrero
(74) *Attorney, Agent, or Firm* — BainwoodHuang

(57) ABSTRACT

Techniques control a utility vehicle. Such techniques involve setting a set of maximum motion limits imposed on the utility vehicle to a set of initial values. Such techniques further involve receiving a set of input signals from a set of sensors, the set of input signals indicating a set of current physical attributes of the utility vehicle. Such techniques further involve, based on the set of input signals, changing at least one maximum motion limit of the set of maximum motion limits from an initial value to an updated value which is different from the initial value.

20 Claims, 6 Drawing Sheets

(56) References Cited

U.S. PATENT DOCUMENTS

| | | | |
|---|---|---|---|
| 7,590,481 B2 | 9/2009 | Lu et al. | |
| 7,668,645 B2 | 2/2010 | Lu et al. | |
| 7,715,965 B2 | 5/2010 | Messih et al. | |
| 7,885,750 B2 | 2/2011 | Lu | |
| 8,219,282 B2 | 7/2012 | Lu et al. | |
| 8,306,697 B2 | 11/2012 | Lu et al. | |
| 8,321,088 B2 | 11/2012 | Brown et al. | |
| 8,395,491 B2 | 3/2013 | Kuemmel et al. | |
| 8,655,533 B2* | 2/2014 | Takagi | B60K 6/46 |
| | | | 180/65.265 |
| 9,221,462 B2 | 12/2015 | Suzuki et al. | |
| 9,352,731 B2 | 5/2016 | Lu et al. | |
| 9,393,878 B1* | 7/2016 | Failing | H02J 7/42 |
| 9,403,415 B2 | 8/2016 | Lu et al. | |
| 9,533,684 B2 | 1/2017 | Kelly et al. | |
| 9,616,900 B2 | 4/2017 | Chen et al. | |
| 9,623,877 B2 | 4/2017 | Chen et al. | |
| 9,738,284 B2 | 8/2017 | Pallett et al. | |
| 9,855,933 B2 | 1/2018 | Richards et al. | |
| 10,108,197 B2 | 10/2018 | Lauffer et al. | |
| 10,124,691 B1* | 11/2018 | Failing | H02J 7/42 |
| 10,202,144 B2 | 2/2019 | Brown et al. | |
| 10,363,939 B2 | 7/2019 | Docker et al. | |
| 10,377,372 B2 | 8/2019 | Kelly | |
| 10,399,566 B2 | 9/2019 | Fairgrieve et al. | |
| 10,414,404 B2 | 9/2019 | Anker et al. | |
| 11,097,731 B2 | 8/2021 | Zhu | |
| 11,130,414 B2* | 9/2021 | Steele | B60L 50/60 |
| 11,359,919 B2 | 6/2022 | Zhang | |
| 11,565,592 B2* | 1/2023 | Robbins | B60L 15/2009 |
| 11,609,098 B1* | 3/2023 | Wittenschlaeger | B60W 30/00 |
| 11,643,068 B1* | 5/2023 | Wittenschlaeger | B60C 23/002 |
| | | | 701/22 |
| 11,752,882 B1* | 9/2023 | Wittenschlaeger | |
| | | | B60L 15/2009 |
| | | | 701/22 |
| 11,878,678 B2* | 1/2024 | Krosschell | B60W 10/22 |
| 2005/0149243 A1 | 7/2005 | Ghoneim | |
| 2008/0234096 A1* | 9/2008 | Joshi | B60K 6/46 |
| | | | 477/3 |
| 2008/0284574 A1 | 11/2008 | Bosch | |
| 2009/0201650 A1* | 8/2009 | Hauser | B60L 15/38 |
| | | | 361/736 |
| 2011/0276216 A1* | 11/2011 | Vaughan | B60W 30/143 |
| | | | 701/31.4 |
| 2011/0302078 A1* | 12/2011 | Failing | H02J 7/42 |
| | | | 700/297 |
| 2012/0226405 A1* | 9/2012 | Gillingham | B60K 1/04 |
| | | | 903/903 |
| 2013/0173098 A1* | 7/2013 | Takagi | B60W 10/06 |
| | | | 701/22 |
| 2013/0173100 A1* | 7/2013 | Takagi | B60L 3/0061 |
| | | | 180/65.265 |
| 2013/0313035 A1* | 11/2013 | Jenkins, Jr. | B60K 6/52 |
| | | | 180/243 |
| 2015/0266386 A1* | 9/2015 | Matsuda | B60L 53/14 |
| | | | 320/109 |
| 2017/0267104 A1* | 9/2017 | Miyashita | B60K 1/04 |
| 2017/0355259 A1* | 12/2017 | Borud | B60K 6/442 |
| 2018/0086222 A1* | 3/2018 | Juang | B60L 58/12 |
| 2020/0171966 A1* | 6/2020 | Steele | B60L 50/60 |
| 2020/0231045 A1* | 7/2020 | Shin | B60L 15/2045 |
| 2021/0394768 A1 | 12/2021 | Kim et al. | |
| 2022/0306222 A1* | 9/2022 | Deckard | B60Q 1/543 |
| 2023/0001914 A1 | 1/2023 | Kim | |
| 2023/0021644 A1 | 1/2023 | Rollinger et al. | |
| 2023/0322206 A1* | 10/2023 | Wittenschlaeger | |
| | | | B60L 15/2045 |
| | | | 701/22 |
| 2023/0376042 A1* | 11/2023 | Wittenschlaeger | B62D 33/04 |
| 2025/0058643 A1* | 2/2025 | Theodosakis | B60L 50/60 |
| 2025/0091445 A1* | 3/2025 | Theodosakis | H01M 10/44 |
| 2025/0171012 A1* | 5/2025 | Theodosakis | B60W 10/26 |
| 2025/0196655 A1* | 6/2025 | Theodosakis | B60L 15/20 |
| 2025/0229638 A1* | 7/2025 | Theodosakis | B60L 7/26 |

FOREIGN PATENT DOCUMENTS

| | | | | |
|---|---|---|---|---|
| DE | 102019200537 A1 | | 7/2020 | |
| EP | 1745953 A1 | | 1/2007 | |
| GB | 2440451 A | | 1/2008 | |
| GB | 2519024 A | | 4/2015 | |
| JP | 2008054441 A | * | 3/2008 | B60L 7/26 |

* cited by examiner

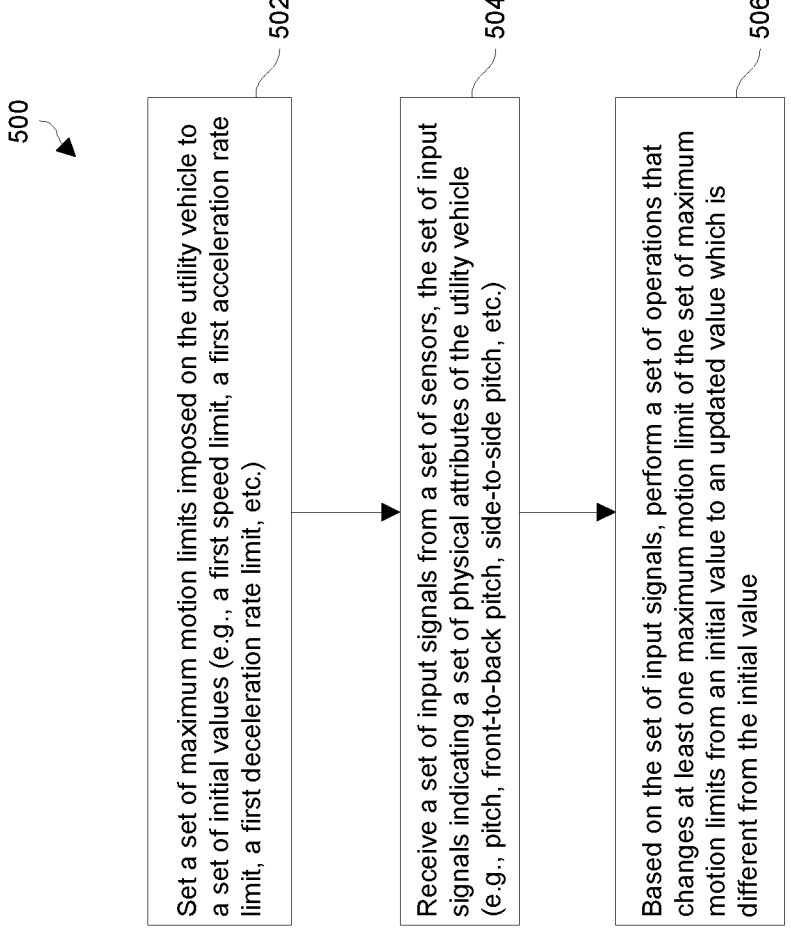

500

Set a set of maximum motion limits imposed on the utility vehicle to a set of initial values (e.g., a first speed limit, a first acceleration rate limit, a first deceleration rate limit, etc.) — 502

Receive a set of input signals from a set of sensors, the set of input signals indicating a set of physical attributes of the utility vehicle (e.g., pitch, front-to-back pitch, side-to-side pitch, etc.) — 504

Based on the set of input signals, perform a set of operations that changes at least one maximum motion limit of the set of maximum motion limits from an initial value to an updated value which is different from the initial value — 506

FIG. 5

GRADE-BASED VEHICLE MOTION CONTROL

BACKGROUND

A conventional electric golf cart includes a motor controller and an electric motor which is connected to the golf cart's drive wheels through the drivetrain. To drive the electric motor and thus move the golf cart, the motor controller provides signals to operate the electric motor in response to sensed depression of the accelerator pedal.

Along these lines, as the operator of the golf cart further depresses the accelerator pedal, the motor controller is programmed to increase the speed of the electric motor and thus increase the speed of the golf cart. However, the motor controller is also programmed to restrict the golf cart from going over an overall top golf cart speed (e.g., 18 miles per hour) as a safety measure. Accordingly, if the operator of the golf cart fully depresses the accelerator pedal, the electric motor of the golf cart may move the golf cart forward but no faster than the overall top golf cart speed.

SUMMARY

It should be understood that there are deficiencies to the above-described conventional approach which simply restricts a golf cart from going over an overall top golf cart speed as a safety measure. For example, the overall top golf cart speed may still be an unsafe speed for the golf cart in certain situations such as when the golf cart is traveling on the side of a steep hill or heading down a steep hill.

One possible way to make the golf cart safer is to program the motor controller with a lower overall top golf cart speed (e.g., use a top golf cart speed of 12 miles per hour in all situations). Unfortunately, there is a significant tradeoff to reducing the top golf cart speed in all situations. In particular, with a lower overall top golf cart speed, it will now take longer to traverse distances even when the golf cart is riding on sturdier flat terrain on which it is still safe to travel at a higher speed.

Another possible way to make the golf cart safer is to configure geofences and provision the golf cart with global position system (GPS) circuitry to enable lowering the top golf cart speed when the golf cart is within a geofence. However, using this GPS approach, there could be GPS-related latencies, GPS inaccuracies, and reliance on external GPS hardware. This also requires pre-defining locations of the geofence.

Improved techniques are directed to controlling a utility vehicle in which at least one maximum motion limit is changed based on one or more current physical attributes of the utility vehicle (e.g., a current front-to-back pitch or grade of the utility vehicle, a current side-to-side roll of the utility vehicle, combinations thereof, etc.). Example maximum motion limits include the utility vehicle's maximum speed limit, maximum acceleration rate, maximum deceleration rate, and the like. Such maximum motion limits may be enforced by one or more inertial measurement units (IMUs). Possible locations for the IMU(s) include in the utility vehicle's motor controller and in a GPS-interface device. By changing one or more maximum motion limits based on grade, the utility vehicle may enjoy a faster maximum motion limit in certain situations for convenience (e.g., when traveling on flat terrain) and a lower maximum motion limit in other situations for safety (e.g., when traveling down or sideways on a steep hill).

One embodiment is directed to a method of controlling a utility vehicle. The method includes setting a set of maximum motion limits imposed on the utility vehicle to a set of initial values. The method further includes receiving a set of input signals from a set of sensors, the set of input signals indicating a set of current physical attributes of the utility vehicle. The method further includes, based on the set of input signals, changing at least one maximum motion limit of the set of maximum motion limits from an initial value to an updated value which is different from the initial value.

Another embodiment is directed to electronic circuitry to control a utility vehicle. The electronic circuitry includes a set of sensors, motor control circuitry constructed and arranged to operate an electric motor for vehicle propulsion, and a controller coupled with the set of sensors and the motor control circuitry. The controller is constructed and arranged to perform a method of:

(A) setting a set of maximum motion limits imposed by the motor control circuitry on the utility vehicle to a set of initial values, (B) receiving the set of input signals from the set of sensors, the set of input signals indicating a set of current physical attributes of the utility vehicle, and (C) based on the set of input signals, changing at least one maximum motion limit of the set of maximum motion limits from an initial value to an updated value which is different from the initial value.

Yet another embodiment is directed to a utility vehicle which includes a battery management system (BMS) having a lithium battery, a utility vehicle propulsion system constructed and arranged to provide utility vehicle propulsion using electric power from the lithium battery, and electronic circuitry coupled with the BMS and the utility vehicle propulsion system. The electronic circuitry is constructed and arranged to perform a method of:

(A) setting a set of maximum motion limits imposed on the utility vehicle to a set of initial values, (B) receiving a set of input signals from a set of sensors, the set of input signals indicating a set of current physical attributes of the utility vehicle, and (C) based on the set of input signals, changing at least one maximum motion limit of the set of maximum motion limits from an initial value to an updated value which is different from the initial value.

In some arrangements, changing the at least one maximum motion limit includes comparing the set of current physical attributes indicated by the set of input signals to a set of physical attribute thresholds to assess safety of the utility vehicle.

In some arrangements, the set of maximum motion limits includes a maximum speed limit imposed on the utility vehicle. Additionally, the initial value is a first maximum speed limit. Furthermore, changing the at least one maximum motion limit further includes, in response to a particular current physical attribute exceeding a corresponding physical attribute threshold, replacing the first maximum speed limit with a second maximum speed limit that is lower than the first maximum speed limit.

In some arrangements, the set of maximum motion limits includes a maximum acceleration rate imposed on the utility vehicle. Additionally, the initial value is a first maximum acceleration rate. Furthermore, changing the at least one maximum motion limit further includes, in response to a particular current physical attribute exceeding a corresponding physical attribute threshold, replacing the first maximum acceleration rate with a second maximum acceleration rate that is lower than the first maximum acceleration rate.

In some arrangements, the set of maximum motion limits includes a maximum deceleration rate imposed on the utility vehicle. Additionally, the initial value is a first maximum deceleration rate. Furthermore, changing the at least one maximum motion limit further includes, in response to a particular current physical attribute exceeding a corresponding physical attribute threshold, replacing the first maximum deceleration rate with a second maximum deceleration rate that is lower than the first maximum deceleration rate.

In some arrangements, the set of maximum motion limits includes a maximum speed limit that is initially set to a first maximum speed limit, a maximum acceleration rate that is initially set to a first maximum acceleration rate, and a maximum deceleration rate that is initially set to a first maximum deceleration rate. Additionally, changing the at least one maximum motion limit includes replacing (i) the first maximum speed limit with a second maximum speed limit that is slower than the first maximum speed limit, (ii) the first maximum acceleration rate with a second maximum acceleration rate that is slower than the first maximum acceleration rate, and (iii) the first maximum deceleration rate with a second maximum deceleration rate that is slower than the first maximum deceleration rate.

In some arrangements, receiving the set of input signals from the set of sensors includes receiving a set of grade measurements from a set of grade sensors of the utility vehicle, the set of grade measurements indicating a set of current angular pitches of the utility vehicle.

In some arrangements, the utility vehicle includes an electric propulsion system that includes an electric motor and motor controller that controls operation of the electric motor. Additionally, receiving the set of grade measurements from the set of grade sensors includes acquiring a set of IMU signals from a set of IMUs of the motor controller while the motor controller controls operation of the electric motor.

In some arrangements, receiving the set of grade measurements from the set of grade sensors includes receiving a longitudinal grade measurement signal indicating a current amount of front-to-back pitch of the utility vehicle.

In some arrangements, changing the at least one maximum motion limit includes, in response to the current amount of front-to-back pitch indicated by the longitudinal grade measurement signal being greater than a predefined front-to-back pitch threshold, lowering at least one of a maximum speed limit, a maximum acceleration limit and a maximum deceleration limit of the utility vehicle.

In some arrangements, receiving the set of grade measurements from the set of grade sensors includes receiving a lateral grade measurement signal indicating a current amount of side-to-side roll of the utility vehicle.

In some arrangements, changing the at least one maximum motion limit includes, in response to the current amount of side-to-side roll indicated by the lateral grade measurement signal being greater than a predefined side-to-side roll threshold, lowering at least one of a maximum speed limit, a maximum acceleration limit and a maximum deceleration limit of the utility vehicle.

In some arrangements, receiving the set of grade measurements from the set of grade sensors includes receiving a longitudinal grade measurement signal indicating a current amount of front-to-back pitch of the utility vehicle, and a lateral grade measurement signal indicating a current amount of side-to-side roll of the utility vehicle.

In some arrangements, changing the at least one maximum motion limit includes:
(i) in response to the current amount of front-to-back pitch of the utility vehicle being greater than a predefined front-to-back pitch threshold, identifying a first new maximum speed for the utility vehicle, and
(ii) in response to the current amount of side-to-side roll of the utility vehicle being greater than a predefined side-to-side roll threshold, identifying a second new maximum speed for the utility vehicle, and
(iii) replacing an initial value for a maximum speed limit of the utility vehicle with a lower of the first new maximum speed for the utility vehicle and the second new maximum speed for the utility vehicle.

In some arrangements, changing the at least one maximum motion limit includes:
(i) in response to the current amount of front-to-back pitch of the utility vehicle being greater than a predefined front-to-back pitch threshold, identifying a first new maximum acceleration rate for the utility vehicle, and
(ii) in response to the current amount of side-to-side roll of the utility vehicle being greater than a predefined side-to-side roll threshold, identifying a second new maximum acceleration rate for the utility vehicle, and
(iii) replacing an initial value of a maximum acceleration rate limit of the utility vehicle with a lower of the first new maximum acceleration rate for the utility vehicle and the second new maximum acceleration rate for the utility vehicle.

In some arrangements, changing the at least one maximum motion limit includes:
(i) in response to the current amount of front-to-back pitch of the utility vehicle being greater than a predefined front-to-back pitch threshold, identifying a first new maximum deceleration rate for the utility vehicle, and
(ii) in response to the current amount of side-to-side roll of the utility vehicle being greater than a predefined side-to-side roll threshold, identifying a second new maximum deceleration rate for the utility vehicle, and
(iii) replacing an initial value of a maximum deceleration rate limit of the utility vehicle with a lower of the first new maximum deceleration rate for the utility vehicle and the second new maximum deceleration rate for the utility vehicle.

In some arrangements, the method further includes:
(i) after changing the at least one maximum motion limit, receiving a new set of grade measurements from the set of grade sensors of the utility vehicle, the new set of grade measurements indicating a new set of current angular pitches of the utility vehicle, and
(ii) based on the new set of input signals, changing the at least one maximum motion limit from updated value to another value which is different from the updated value.

Other embodiments are directed to systems, subsystems, apparatus, assemblies, and so on. Some embodiments are directed to various methods, componentry, platforms, crafts, etc. which are involved in grade-based motion control.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 5 is a flowchart of a procedure for grade-based motion control in accordance with certain embodiments.

DETAILED DESCRIPTION

An improved technique is directed to grade-based vehicle motion control. Along these lines, at least one maximum motion limit of a utility vehicle may be changed based on one or more current physical attributes of the utility vehicle (e.g., a current front-to-back pitch or grade of the utility vehicle, a current side-to-side roll of the utility vehicle, combinations thereof, etc.). Example maximum motion limits which are suitable for use include the utility vehicle's maximum speed limit, maximum acceleration rate, and/or maximum deceleration rate. Such maximum motion limits may be enforced by the utility vehicle's motor controller. Moreover, in some arrangements, the current physical attributes of the utility vehicle are measured by a set of inertial measurement units (IMUs) of the utility vehicle's motor controller. By changing one or more maximum motion limits based on vehicle pitch, the utility vehicle may enjoy a faster maximum motion limit in certain situations for convenience (e.g., when traveling on flat terrain) and a lower maximum motion limit in other situations for safety (e.g., when traveling down or sideways on a steep hill).

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
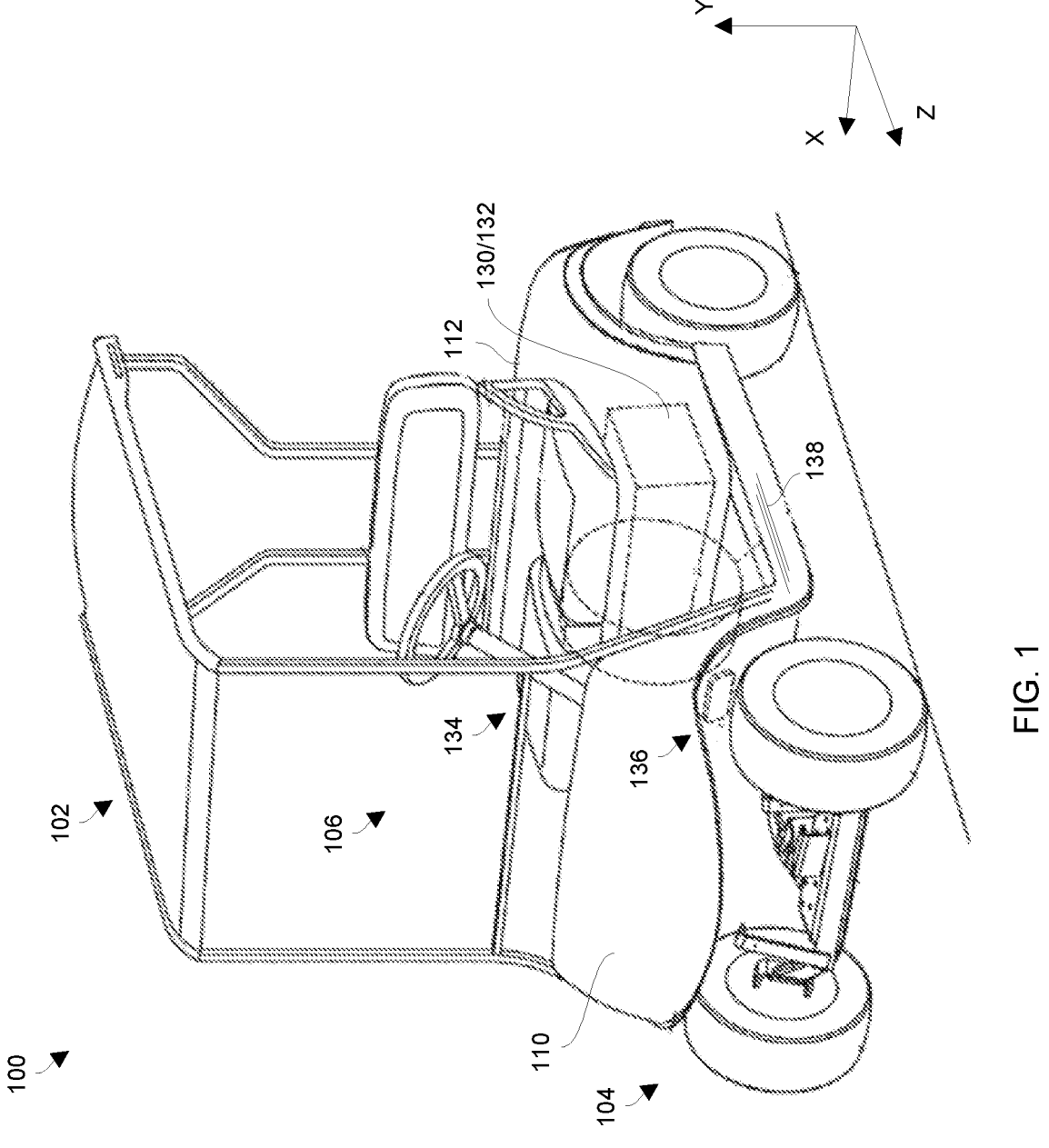
FIG. 1 is a diagram of an example vehicle which provides grade-based motion limiting in accordance with certain embodiments.

FIG. 1 shows an example utility vehicle 100 which provides grade-based motion control in accordance with certain embodiments. The utility vehicle 100 includes a utility vehicle body 102 (e.g., a chassis, a frame, etc.), a set of engagement members 104 (e.g., a set of tires), and a motion control system 106. It should be understood that the utility vehicle 100 has the form factor of a golf car by way of example only and that other utility vehicle form factors are suitable for use as well such as those of personnel and/or cargo transport vehicles, food and beverage vehicles, hospitality vehicles, all-terrain vehicles (ATVs), utility task vehicles (UTVs), tracked vehicles, larger specialized equipment and/or application vehicles, motorcycles, scooters, as well as other lightweight and/or special purpose vehicles.

The utility vehicle body 102 defines a vehicle front 110 and a vehicle back 112. Accordingly, when the utility vehicle 100 moves forward, the utility vehicle 100 is considered to move in a front-to-back direction (i.e., the positive Z-direction in FIG. 1).

The set of engagement members 104 is constructed and arranged to interact with the environment to move the utility vehicle 100. It should be understood that various types of engagement members 104 are suitable for use (e.g., tires/wheels, tracks, rails, combinations thereof, etc.) depending on the type of environment or terrain (e.g., a road, dirt, brush, snow, ice, marsh, etc.).

The motion control system 106 is constructed and arranged to control vehicle movement such as drive provided by the set of engagement members 104, speed control, braking, and so on thus enabling the utility vehicle 100 to effectively maneuver and perform useful work. The motion control system 106 may include, among other things, a motor system 130, a battery management system 132, and additional components 134 such as a set of user controls 136 (e.g., foot pedals, transmission control, a keyed switch, a maintenance switch, additional levers/knobs/etc.), cabling 138, and so on.

It should be understood that certain components of the motor control system 106 (or portions thereof) may be disposed within a set of compartments (in one or more compartments) under a set of seats (under one or more seats) of the utility vehicle 100. For example, a compartment underneath a seat of the utility vehicle 100 may house one or more rechargeable batteries, control circuitry, cabling, controls, etc. for ease of access/serviceability, to protect passengers, for protection against damage, for security, and so on. Other locations are suitable for use as well such as under a hood, under a rear bed, etc.

It should be further understood that the motion control system 106 includes other apparatus/components as well. Along these lines, the motion control system 106 further includes a drivetrain (e.g., a set of gears, linkage, differential, etc.) that connects the motor system 130 to the set of engagement members 104 (e.g., two drive wheels and two non-drive wheels), a steering wheel (or column), a steering gear set that connects the steering wheel to certain engagement members 104, a set of brakes, other controls and sensors, and so on.

As will be explained in further detail shortly, the utility vehicle 100 includes an electric traction motor which runs on electric power from a rechargeable battery for propulsion, and which may be equipped with a regenerative braking control feature which recharges the rechargeable battery. Moreover, the utility vehicle 100 is configured to operate in accordance with a set of maximum motion limits (e.g., to protect equipment of the utility vehicle 100, to protect passengers and/or bystanders, combinations thereof, etc.). Such a set of maximum motion limits or constraints (e.g., a maximum speed limit, a maximum acceleration rate, a maximum deceleration rate, combinations thereof, etc.) are the highest motion limits permitted/allowed by the motion control system 106 during operation of the utility vehicle 100.

During operation, the utility vehicle 100 is configured to automatically select, in real-time, particular maximum motion limits based on a set of current physical attributes of the utility vehicle 100. Along these lines, if the utility vehicle 100 is on flat terrain, the utility vehicle 100 may select and use a default set of maximum motion limits. However, if the utility vehicle 100 is on a slight incline (e.g., a grade or slope of 2.5 to 4.5 degrees) the utility vehicle 100 may select and use one or more lower maximum motion limits. Additionally, if the utility vehicle 100 is on a steeper incline (e.g., a grade or slope of 4.5 to 6.5 degrees) the utility vehicle 100 may select and use one or more even lower maximum motion limits, and so on.

In some arrangements in which the utility vehicle 100 is capable of performing regenerative braking, the utility vehicle 100 may impose different deceleration rates depending on the orientation and severity of the orientation of the utility vehicle 100. Such operation ensures the utility vehicle 100 remains safely on the ground surface and that the utility vehicle 100 maneuvers in a controlled manner.

However, even if the utility vehicle 100 is equipped with only mechanical brakes, the utility vehicle 100 may control operation of the mechanical brakes to impose grade-based deceleration control. Further details will now be provided with reference to FIGS. 2 and 3.

Figure 2:
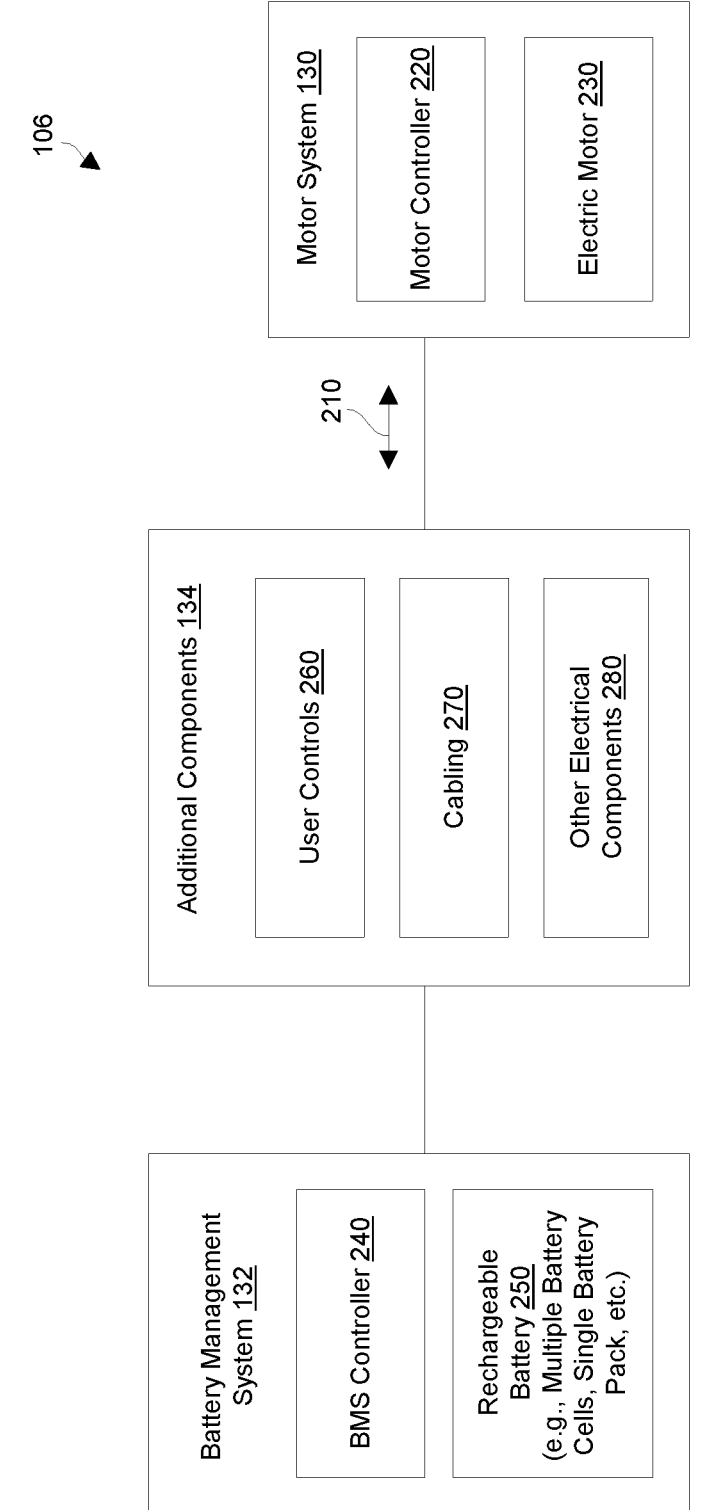
FIG. 2 is a block diagram of a portion of the example vehicle in accordance with certain embodiments.
Figure 3:
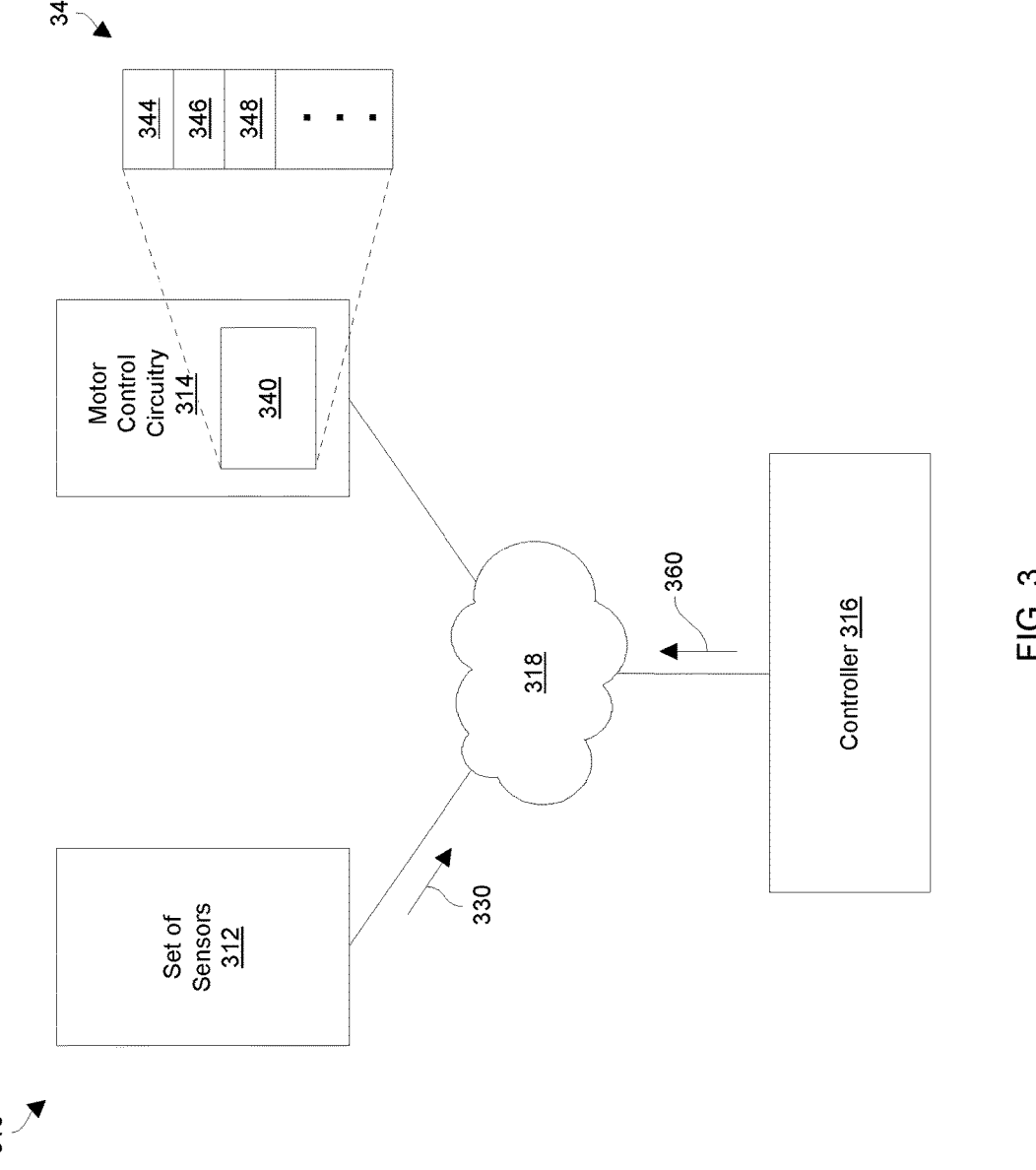
FIG. 3 is another block diagram of a portion of the example vehicle in accordance with certain embodiments.

FIGS. 2 and 3 provide certain details regarding grade-based motion control in accordance with certain embodiments. FIG. 2 is a view 200 of at least a portion of the motion control system 106 of the utility vehicle 100 (also see FIG. 1) in accordance with certain embodiments. FIG. 3 is a view 300 of certain components of the motion control system 106 which are involved in grade-based motion control in accordance with certain embodiments.

As shown in the view 200 of FIG. 2, the motor system 130, the battery management system (BMS) 132, and the additional components 134 are coupled with each other (e.g., via power buses, communications buses, etc.) and exchange electrical signals 210 (e.g., power signals, control/status signals, sensor signals, and so on). The motor system 130 includes a motor controller 220 and an electric traction motor 230 (or simply electric motor 230) coupled with the motor controller 220. The BMS 132 includes a BMS controller 240 and a rechargeable battery 250 coupled with the BMS controller 240. The additional components 134 refer to various componentry coupled with the motor system 130 and/or the battery management system 132 such as user controls 260 (e.g., switches, pedals, etc.), cabling 270 (e.g., power cables, communications buses, etc.), and other electrical components 280 (e.g., a charging receptacle and/or an onboard charger, lights, specialized equipment, other loads, etc.). In some arrangements, various components of the motion control system 106 communicate through a controller area network (CAN) bus via electronic CAN messages in accordance with the CAN protocol.

The motor controller 220 of the motor system 130 is constructed and arranged to control delivery of stored electric energy from the BMS 132 to the electric motor 230 which ultimately operates at least some of the engagement members 124 to move the utility vehicle 100. Additionally, the motor controller 220 may operate the electric motor 230 to provide regenerative braking in which the electric motor 230 converts kinetic energy of the moving utility vehicle 100 into electrical energy to recharge the rechargeable battery 250 (e.g., during braking, while the utility vehicle 20 coasts downhill, during accelerator pedal release, etc.). To this end, the motor controller 220 and/or the additional components 134 may be provisioned with a battery system interface that enables the motor controller 220 to robustly and reliably connect with and communicate with the BMS 132.

In accordance with certain embodiments, the electric motor 230 is a three-phase induction motor which includes a stator having three-phase windings, and a rotor connected to one or more engagement members 104 (also see FIG. 1). The motor controller 220 operates the electric motor 230 by providing a three-phase AC current through the stator to produce a rotating magnetic field which rotates the rotor either in the forward or reverse direction. The motor controller 220 controls the rate of rotation and strength by controlling the frequency and amplitude of the AC current.

The BMS controller 240 of the BMS 132 is constructed and arranged to control electrical access to the rechargeable battery 250. Additionally, the BMS 132 may respond to various events such as sleep events (e.g., timeouts) to prevent excessive discharging of the rechargeable battery 250, overvoltage events to prevent creating an overvoltage situation, etc. thus safeguarding the rechargeable battery 250. The BMS controller 240 may respond to other events as well such as wakeup events (e.g., actuation of the user controls 136, etc.), charging events, faults, and so on to properly and safely control charging and discharging of the rechargeable battery 250.

It should be understood that a variety of battery types and form factors are suitable for the rechargeable battery 250. For example, the rechargeable battery 250 may be a lithium battery which includes multiple lithium battery cells, a single battery pack, combinations thereof, and so on. As another example, the rechargeable battery 250 may utilize one or more lead acid batteries in place of, or in combination with, the lithium battery, and so on. In some multi cell arrangements, the BMS controller 240 monitors various individual metrics from each cell (e.g., state of charge, voltage, temperature, etc.) and is constructed and arranged to provide such individual metrics and/or aggregated metrics (e.g., the highest voltage among the cells, the lowest voltage among the cells, the highest temperature among the cells, the lowest temperature among the cells, averaged and/or median values, etc.) to the motor system 130 (e.g., periodically, in response to commands, combinations thereof, etc.).

In accordance with some embodiments, the BMS controller 240 includes a BMS contactor and a BMS control circuit that closes the BMS contactor in order to connect the rechargeable battery 250 to the motor system 130. If the BMS control circuit detects certain events and/or faults, the BMS control circuit opens the BMS contactor to disconnect the rechargeable battery 250 from the motor system 130. For example, if there is too much regenerative braking charge supplied by the motor system 130 while the rechargeable battery 250 is almost fully charged, the BMS control circuit may open the BMS contactor to avoid an overvoltage situation. Such operation safeguards the rechargeable battery 250.

The user controls 260 of the additional components 134 are constructed and arranged to enable an operator to control operation of the utility vehicle 100 (FIG. 1). Along these lines, the user controls 260 may include an accelerator pedal to enable an operator to control the speed, etc. of the electric motor 230 and thus the speed, etc. of the utility vehicle 100. Additionally, the user controls 260 may include a brake pedal to enable the operator to provide braking (e.g., regenerative braking, deployment of a mechanical service brake if available, engagement of an emergency or parking brake if fully depressed, etc.). Furthermore, the user controls 260 may include a transmission switch to control whether the motor system 130 moves the utility vehicle 100 in the forward (or front-to-back) direction or reverse (or back-to-front) direction in response to pedal depression. Other user controls 260 include a keyed switch, a tow switch, and so on.

In some arrangements, speed control which is based on the amount of accelerator pedal deflection (or depression) involves Hall sensing and inductive throttles. However, other mechanisms are suitable for use as well such as measuring accelerator pedal deflection using a potentiometer or similar device, accessing a mapping table which maps (or converts) a signal from the potentiometer to particular speeds, etc.

During operation, the operator may use the utility vehicle 100 to perform useful work. For example, in the context of a golf cart, the operator may drive the utility vehicle 100 over terrain while utility vehicle 100 carries one or more sets of golf clubs to maneuver among holes of a golf course. Such terrain may include flat areas, uphill areas, downhill areas, side hill areas, and so on.

As mentioned earlier, other uses exist for the utility vehicle 100 (e.g., personnel and/or cargo transport, catering, emergency applications, off-road applications, specialized applications, etc.). For such other uses, the environment may be similar to and/or different from the terrain.

During such operation, there may be times when the electric motor 230 uses electric power from the rechargeable battery 250 (e.g., while the utility vehicle 100 drives uphill and/or on a flat area for an extended time). Additionally, there may be other times when the electric motor 230 performs regenerative braking to provide electrical energy back to the rechargeable battery 250 (e.g., while the utility vehicle 100 drives downhill). During these times, the specialized circuitry monitors current physical attributes of the utility vehicle 100 and adjusts one or more maximum motion limits (or constraints) on the utility vehicle 100 as will now be described in further detail.

As shown in the view 300 of FIG. 3, certain electronic circuitry 310 of the motor system 130 is involved in grade-based vehicle motion control. The electronic circuitry 310 includes a set of sensors 312, motor control circuitry 314, a controller 316, and a communications medium 318.

The set of sensors 312 is constructed and arranged to sense various physical attributes of the utility vehicle 100. Example physical attributes that may be sensed and/or derived from other sensed physical attributes include the utility vehicle's pitch, roll, angular speeds, directional accelerations, and the like. Suitable sensor components for the set of sensors 312 include accelerometers, gyroscopes, and the like. Such components enable the set of sensors 312 to measure and output a set of sensor signals 330 indicating certain physical (or mechanical) attributes such as acceleration, vehicle pitch, vehicle orientation, vibration, combinations thereof, etc. in one or more directions (e.g., one, two, or three directions).

In some embodiments, one or more sensors 312 are built-in to the motor controller 220 (also see FIG. 2). In some embodiments, one or more sensors 312 are external to the motor controller 220 (e.g., one or more discrete components). In some embodiments, the set of sensors 312 includes one or more components forming part of the motor controller 220, and one or more components external to the motor controller 220.

The motor control circuitry 314 is constructed and arranged to control operation of the electric motor 230 (also see FIG. 2). Along these lines, the motor control circuitry 314, which is part of the motor controller 220 (FIG. 2), monitors various inputs such as accelerator pedal depression (e.g., angular displacement of the accelerator pedal), the current transmission setting (e.g., forward, reverse, and neutral), brake pedal depression, and so on. In response to such inputs, the motor control circuitry 314 operates the electric motor 230 by providing various motion responses (e.g., speed, acceleration, deceleration, etc.).

Additionally, in some embodiments, the motor control circuitry 314 includes memory 340 (e.g., a bank of control/status registers) which stores a set of operating parameters 342 such as a maximum speed limit 344, a maximum acceleration rate 346, a maximum deceleration rate 348, and so on. The motor control circuitry 314 uses the set of operating parameters 342 as operating constraints and/or guidance and may control the rate of rotation of the electronic motor 230 in response thereto (e.g., via signal strength, based on timing, whether to perform regenerative braking, etc.) to smoothen vehicle behavior, provide safety, improve the user experience, etc. As will be explained in further detail shortly, one or more of the operating parameters 342 may be changed in real-time (e.g., set at startup, changed at time T0 during runtime, changed again at time T1 during runtime, and so on).

The controller 316 is constructed and arranged to provide a set of control signals 360 to the motor control circuitry 314. The set of control signals 360 determines how the motor control circuitry 314 operates the electric motor 230.

Along these lines, the controller 316 may receive the set of sensor signals 330 from the set of sensors 312 and perform operations to determine whether to change any of the set of operating parameters 342 used by the motor control circuitry 314. For example, the controller 316 may initially direct the motor control circuitry 314 to use a set of default values for the set of operating parameters 342. Then, based on various factors indicated by the set of sensor signals 330, the controller 316 may update one or more of the set of operating parameters 342 with new values. The controller 316 may continue this operation in an ongoing manner (e.g., while the utility vehicle 100 is driven by an operator) thus achieving real-time grade-based vehicle motion control.

The communications medium 318 is constructed and arranged to connect the various components of the electronic circuitry 310 together to enable these components to exchange electronic signals (e.g., see the arrows 330 and 360). The communications media 318 is illustrated as a cloud to indicate that the communications media 318 is capable of having a variety of different topologies including backbone, hub-and-spoke, loop, irregular, combinations thereof, and so on. Along these lines, the communications media 318 may include copper-based data communications devices and cabling, fiber optic devices and cabling, wireless devices for wireless communications, combinations thereof, etc. Furthermore, the communications media 318 is capable of using one or more buses, cables, individual conductors, circuit board traces, communications interfaces, shared resources, combinations thereof, etc.

It should be understood that, initially, the set of operating parameters 342 may have been pre-loaded into the motor control circuitry 314 by the controller 316 (e.g., when the utility vehicle 100 is turned on). Alternatively, the motor control circuitry 314 may persistently store the set of operating parameters 342 and thus have access to the set of operating parameters 342 at the onset of operation.

Then, in an ongoing manner, the controller 316 receives the set of sensor signals 330 from the set of sensors 312 through the communications medium 318 and performs operations to determine whether to change any of the set of operating parameters 342 used by the motor control circuitry 314. If the controller 316 determines, based on the set of sensor signals 330, that the set of current physical attributes of the utility vehicle 100 fits a certain set of criteria, the controller 316 outputs the set of control signals 360 to the motor control circuitry 314 through the communications medium 318 to update one or more of the set of operating parameters 342.

Accordingly, the controller 316 adjusts a set of maximum motion limits in real time based on a set of current physical attributes of the utility vehicle 100. The motor control circuitry 314 then imposes the adjusted set of maximum motion limits on the utility vehicle 100 while the utility vehicle 100 is being driven. Accordingly, such motion limiting adjustment is made by the electronic circuitry 300 automatically without requiring user intervention. Further details will now be provided with reference to FIG. 4.

Figure 4:
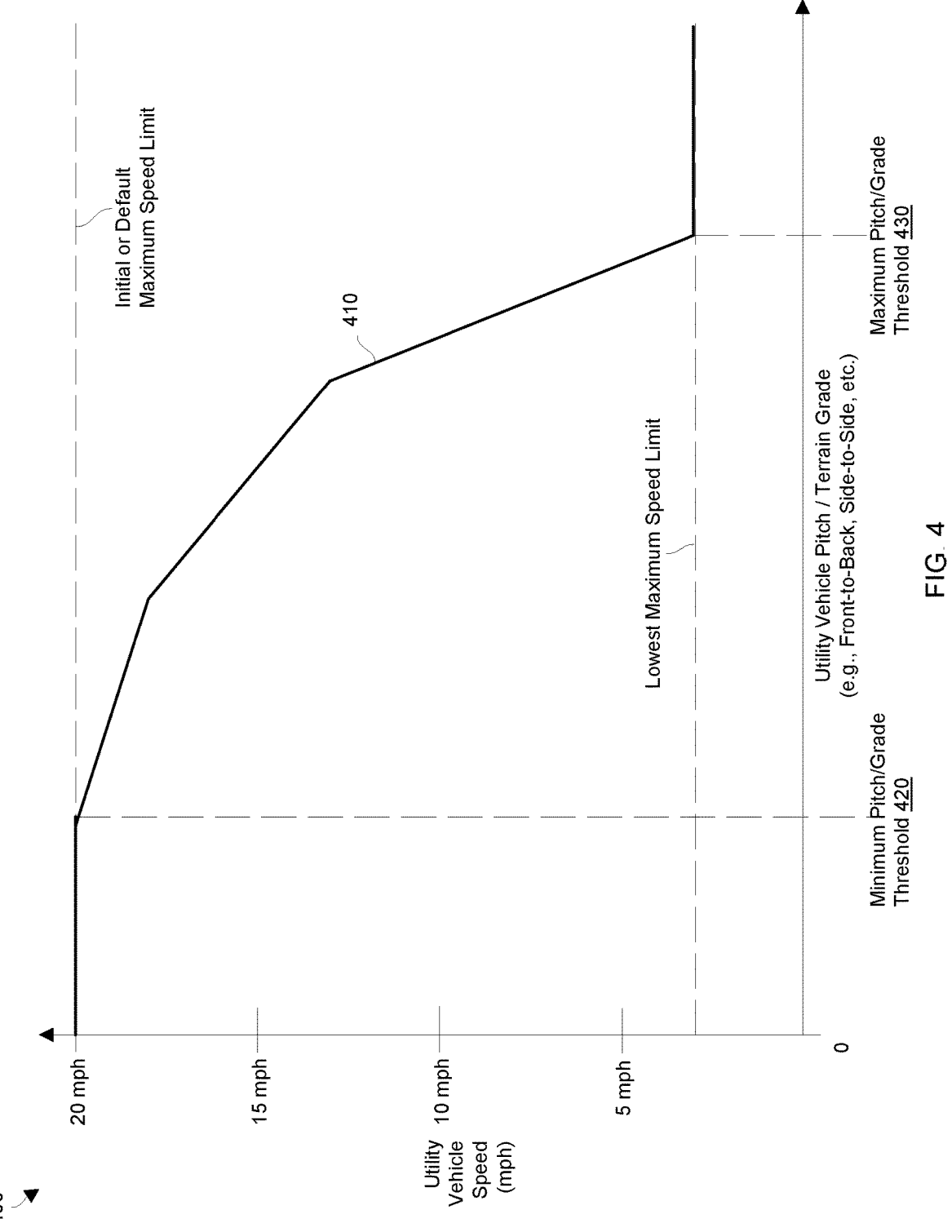
FIG. 4 is a chart of a motion limit curve in accordance with certain embodiments.

FIG. 4 shows a view 400 of a motion limit curve 410 for the utility vehicle 100 in accordance with certain embodiments. The controller 316 uses the motion limit curve 410 to determine whether to adjust a corresponding motion limit imposed by the motor control circuitry 314 (also see FIG. 3).

It should be understood that the controller 316 may use a separate motion limit curve 410 for different physical attributes. For example, the controller 316 may have a first motion limit curve 410 for front-to-back pitch, second motion limit curve 410 for side-to-side roll, a third motion limit curve 410 for roll, another motion limit curve 410 for angular speed, and so on. In some arrangements, the controller 316 may derive other physical attributes from physical attributes sensed by the set of sensors 312.

FIG. 4 shows, by way of example, a motion limit curve 410 which maps (or plots) vehicle pitch (or terrain grade) to maximum speed limits for the utility vehicle 100. As mentioned earlier, the current vehicle pitch of the utility vehicle 100 may be identified from the set of sensor signals 330 (also see FIG. 3).

As shown in FIG. 4, the example motion limit curve 410 indicates that the utility vehicle 100 should use an initial or default maximum speed limit when the current vehicle pitch is below a minimum pitch (or terrain grade) threshold 420. That is, the motion limit curve 410 indicates that no change or update needs to be made to the utility vehicle's current maximum speed limit while the pitch of the utility vehicle 100 is less than the minimum pitch threshold 420.

For example, suppose that the initial or default maximum speed limit for the utility vehicle 100 is 20 miles per hour (mph) and that the minimum pitch threshold 420 is 2°. Further suppose that the set of sensor signals 330 indicates that the current pitch of the utility vehicle 100 is less than 2°. The controller 316 compares the current pitch of the utility vehicle 100 (less than) 2° to the minimum pitch threshold 420 (2°) and determines that the current pitch is below the minimum pitch threshold 420. In response to the current pitch being below the minimum pitch threshold 420, the controller 316 decides that no intervention is necessary and that the motor control circuitry 314 should continue to use the default maximum speed limit of 20 mph.

In some arrangements, the controller 316 does not output any command signal 360 enabling the motor control circuitry 314 to continue using the default maximum speed limit of 20 mph. In other arrangements, the controller 316 outputs a command signal 360 directing the motor control circuitry 314 to use the default maximum speed limit. In yet other arrangements, the controller 316 outputs a command signal 360 directing the motor control circuitry 314 to use a particular maximum speed limit which is the default value.

Next, suppose that the utility vehicle 100 encounters a pitch that is higher than the threshold 420. For example, suppose that the set of sensor signals 330 now indicates that the current pitch of the utility vehicle 100 is greater than the minimum pitch threshold 420. In this situation, the controller 316 compares the current pitch of the utility vehicle 100 to the minimum pitch threshold 420 and determines that the current pitch is above the minimum pitch threshold 420. In response to the current pitch being above the minimum pitch threshold 420, the controller 316 concludes that intervention is necessary and that the motor control circuitry 314 should lower the maximum speed limit.

By way of example, suppose that the controller 316 identifies the current pitch to be 3° and the corresponding maximum speed limit to be 16 mph as indicated by the motion limit curve 410 (e.g., see FIG. 4). The controller 316 then outputs a command signal 360 to the motor control circuitry 314 directing the motor control circuitry 314 to adjust the maximum speed limit from 20 mph to 16 mph (e.g., also see the parameters 342 in FIG. 3). In response to the command signal 360 from the controller 316, the motor control circuitry 314 does not allow the speed of the utility vehicle 100 to exceed 16 mph. Such operation continues in this manner while the operator continues driving the utility vehicle 100 at the current pitch.

It should be understood that there are variety of ways to configure the controller 316 to output command signals 360 using the motion limit curve 410. In some embodiments, the controller 316 accesses a map or lookup table having entries that map different pitches to maximum speed limits (e.g., a mapping stored in local memory). In other embodiments, the controller 316 computes the maximum speed limits using a function that implements the curve 410 (e.g., the input is current pitch and the output or response is the computed maximum speed limit). Other mechanisms for implementing the curve 410 are suitable for use as well.

It should be understood that the motion limit curve 410 may be further defined by a maximum pitch threshold 430. For example, suppose that the maximum pitch threshold 430 is 6.5° and that the lowest maximum speed limit is 3 mph. When the controller 316 determines that the current pitch of the utility vehicle 100 is above the maximum pitch threshold 430 of 6.5°, the controller 316 sends a command signal 360 to the motor control circuitry 314 directing the motor control circuitry 314 to adjust the maximum speed limit to the lowest speed limit of 3 mph. In this situation, the utility vehicle 100 is still able to move forward but in accordance with this minimum speed limit.

In some arrangements, the controller 316 may perform other operations when the controller 316 determines that the current pitch of the utility vehicle 100 is above the maximum pitch threshold 430. For example, the controller 316 may output a warning (e.g., flash an alert on a display, output an audio signal, combinations thereof, etc.), send an alert to a central station, and so on.

The motion limit curve 410 was described above as being for maximum speed limits for the utility vehicle 100. It should be understood that the controller 316 may impose grade-based control over other types of motion limits as well. In accordance with certain embodiments, the controller 316 imposes a similar motion limit curve 410 for maximum speed limit, for maximum acceleration rate, and for maximum deceleration rate. Other motion limits are suitable for use as well.

Regarding grade-based control over a maximum acceleration rate for the utility vehicle 100, the controller 316 may not intervene when the current pitch of the utility vehicle 100 is less than a predefined threshold 420. However, when the current pitch exceeds the predefined threshold 420, the controller 316 determines a lower maximum acceleration rate for use by the motor control circuitry 314 in accordance with a motion limit curve 410 for maximum acceleration rate. The controller 316 then sends a command signal 360 to the motor control circuitry 314 in the same or similar manner as described above for changing the maximum speed limit to adjust an earlier maximum acceleration rate to a new maximum acceleration rate.

The controller 316 may continue to intervene (i.e., provide adjustments to the maximum acceleration rate) while the current pitch of the utility vehicle 100 exceeds the predefined threshold 420 for the maximum acceleration rate curve. Along these lines and in an ongoing manner, the controller 316 continues to assess the current pitch of the utility vehicle 100 and output command signals 360 to effectuate the maximum acceleration rate curve. Such operation improves the safety of the utility vehicle 100.

Regarding grade-based control over a maximum deceleration rate for the utility vehicle 100, the controller 316 may not intervene when the current pitch of the utility vehicle 100 is less than a predefined threshold 420. However, when the current pitch exceeds the predefined threshold 420, the controller 316 determines a lower maximum deceleration rate for use by the motor control circuitry 314 in accordance with a motion limit curve 410 for maximum deceleration rate. The controller 316 then sends a command signal 360 to the motor control circuitry 314 in the same or similar manner as described above to adjust an earlier maximum deceleration rate to a new maximum deceleration rate.

The controller 316 may continue to intervene (i.e., provide adjustments to the maximum deceleration rate) while the current pitch of the utility vehicle 100 exceeds the predefined threshold 420 for the maximum deceleration rate curve. Along these lines and in an ongoing manner, the controller 316 continues to assess the current pitch of the utility vehicle 100 and output command signals 360 to effectuate the maximum deceleration rate curve. Again, such operation improves the safety of the utility vehicle 100.

In accordance with certain embodiments, the controller 316 imposes control over multiple motion limits (e.g., maximum speed limit, maximum acceleration rate, and maximum deceleration rate) simultaneously and in an ongoing manner. Such operation over the multiple motion limits may be based on the same set of sensor signals 330 (e.g., the controller 316 determines whether to adjust any of the motion limits from the same set of sensor signals 330 as corresponding to a particular time). In some arrangements, the controller 316 derives one or more physical attributes from which motion control is based from other physical attributes identified by the set of sensor signals 330.

It should be understood that the various motion limit curves 410 for maximum speed limit, maximum acceleration rate, maximum deceleration rate, etc. may look similar (or even different). However, such curves 410 may have different thresholds and map different pitches/grades to different motion limit values, and so on. Further details will now be provided with reference to FIG. 5.

FIG. 5 is a flowchart of a procedure 500 of controlling a utility vehicle (e.g., motion limiting) based on current terrain grade or vehicle pitch in accordance with certain embodiments. Such a procedure 500 may be performed by specialized circuitry of the utility vehicle such as by a motor controller, a BMS, an external device, other circuitry, combinations thereof, etc. (e.g., also see the controller 316 in FIG. 3).

At 502, the specialized circuitry initially sets a set of maximum motion limits (or constraints) imposed on the utility vehicle to a set of initial values. For example, the specialized circuitry may impose a first speed limit, a first acceleration rate limit, and/or a first deceleration rate limit on the utility vehicle.

At 504, the specialized circuitry receives a set of input signals from a set of sensors. The set of input signals indicates a set of current physical attributes of the utility vehicle (e.g., current pitch, current roll, current angular displacement, etc.). In some arrangements, the set of current physical attributes includes vehicle pitch at any orientation. In other arrangements, the set of current physical attributes is more precise and includes front-to-back vehicle pitch and side-to-side vehicle pitch, etc.

At 506, based on the set of input signals, the specialized circuitry performs a set of operations that changes at least one maximum motion limit of the set of maximum motion limits from an initial value to an updated value which is different from the initial value. Here, the specialized circuitry may first perform a physical attribute assessment that determines that intervention is necessary because a current physical attribute of the utility vehicle (e.g., vehicle pitch) exceeds a threshold. Next, the specialized circuitry may perform a motion limit selection operation that ascertains an appropriate new value to use in place of the initial value (e.g., for maximum speed limit, the specialized circuitry may replace 20 mph with 12 mph based on the current pitch of the utility vehicle). After the specialized circuitry selects the new value, the specialized circuitry changes the initial value to the new value.

It should be understood that the specialized circuitry continues to perform 504 and 506 in an ongoing manner. Accordingly, the set of maximum motion limits imposed by the utility vehicle may change over time based on the pitch (or other physical attributes) of the utility vehicle. Further details will now be provided with reference to FIG. 6.

Figure 6:
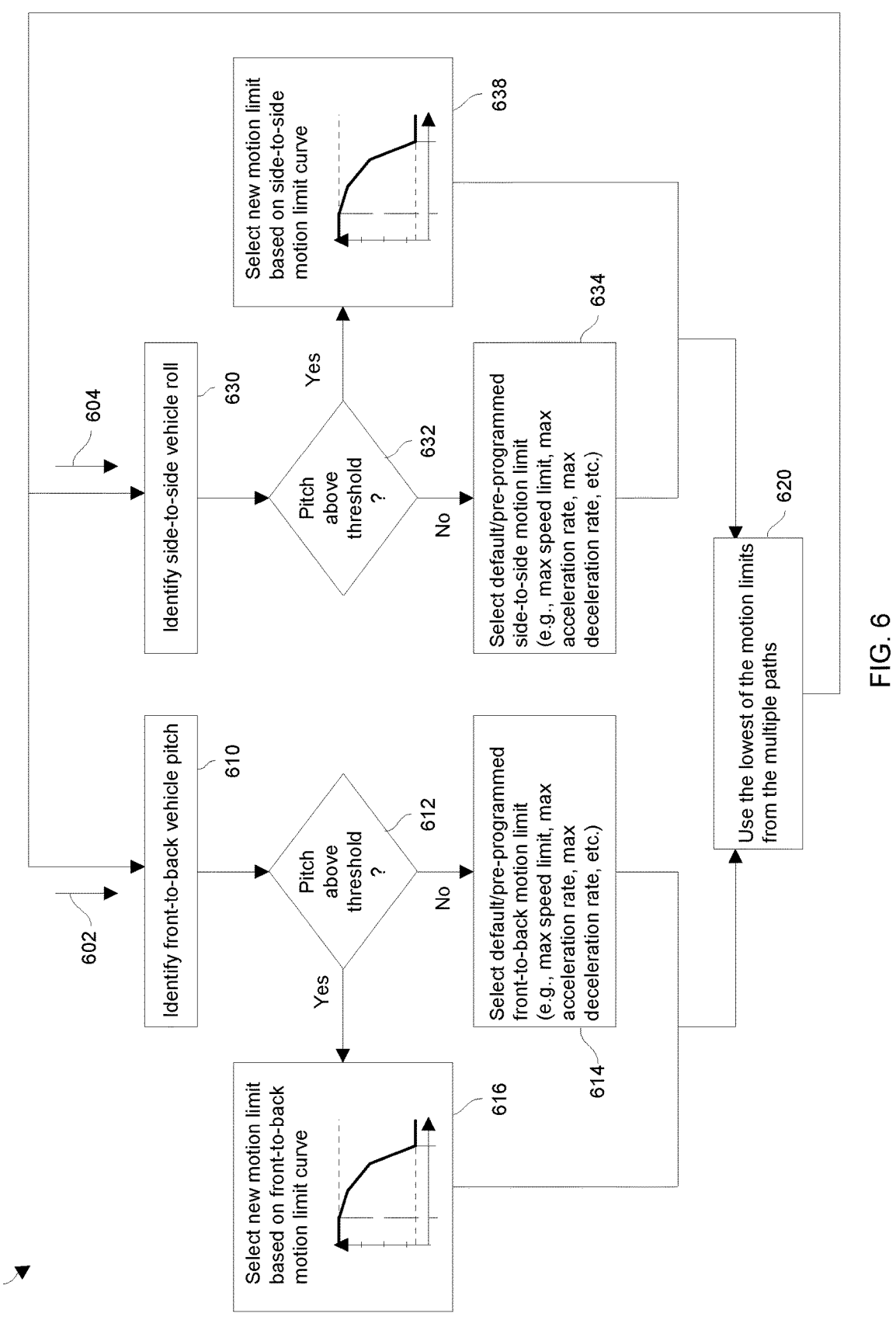
FIG. 6 is a flowchart of another procedure in accordance with certain embodiments.

FIG. 6 is a flowchart of a procedure 600 which is performed by specialized circuitry (e.g., see the controller 316 in FIG. 3). The procedure 600 involves operations for updating an initial value of a maximum motion limit with a new value. The procedure 600 is suitable for use as a least a portion of 506 in the procedure 500 (also see FIG. 5).

It should be understood that the procedure 600 is suitable for controlling a variety of different motion limits such as the maximum speed limit, the maximum acceleration rate, and/or the maximum deceleration rate for the utility vehicle. By way of example, the procedure 600 is described below as performing grade-based speed limit control.

It should be understood that, by way of example, the procedure 600 includes multiple paths 602, 604 to evaluate multiple physical attributes of a utility vehicle (also see FIG. 1). The path 602 evaluates, as a physical attribute of the utility vehicle, front-to-back vehicle pitch (e.g., pitch along the Z-axis in FIG. 1). The path 604 evaluates, as another physical attribute of the utility vehicle, side-to-side vehicle pitch (e.g., pitch along the X-axis in FIG. 1). Accordingly, it should be understood that the procedure 600 may use different motion limit curves for the different physical attributes (e.g., a first speed limit curve similar to that shown in FIG. 4 for front-to-back grade-based speed limit control, and a second speed limit curve similar to that shown in FIG. 4 for side-to-side grade-based speed limit control).

In other embodiments, the procedure 600 includes a different number of paths and/or paths that assess different physical attributes of the utility vehicle (e.g., vehicle pitch at other angles, roll, angular displacement, torque, center of gravity, vibration, combinations thereof, etc.). Moreover, the different paths may impose different motion limit curves (e.g., see FIG. 4).

Regarding path 602, at 610, the specialized circuitry identifies front-to-back vehicle pitch. Along these lines, the specialized circuitry may have received a set of sensor signals from a set of sensors (e.g., see 504 in FIG. 5). At 610, the specialized circuitry determines the current front-to-back vehicle pitch from the set of sensor signals. In some arrangements, the specialized circuitry derives the front-to-back vehicle pitch from the set of sensor signals.

At 612, the specialized circuitry determines whether the current front-to-back vehicle pitch is greater than a front-to-back vehicle pitch threshold. Along these lines, the specialized circuitry may perform a comparison operation between the current front-to-back vehicle pitch and the front-to-back vehicle pitch threshold (e.g., see the minimum pitch threshold 420 in FIG. 4). If the current front-to-back vehicle pitch is not greater than the front-to-back vehicle pitch threshold, the specialized circuitry proceeds to 614. However, if current front-to-back vehicle pitch is greater than the front-to-back vehicle pitch threshold, the specialized circuitry proceeds to 616.

At 614, since the current front-to-back vehicle pitch is not greater than the front-to-back vehicle pitch threshold, the specialized circuitry simply identifies, as a candidate motion limit, the normal default value. Along these lines, the normal default value may be the initial or maximum motion limit in a motion limit function imposed by the specialized circuitry. For example, for speed limit control, the maximum speed limit on the speed limit curve 410 in the example of FIG. 4 is 20 mph.

At 616, since the current front-to-back vehicle pitch is greater than the front-to-back vehicle pitch threshold, the specialized circuitry selects, as a candidate motion limit, a value that is different from the normal default value. For example, for speed limit control, the new value on the speed limit curve 410 in the example of FIG. 4 may be less than 20 mph such as 12 mph.

A candidate result of evaluation path 602 is then provided to 620. In particular, if the path 602 went through 614, the evaluation path 602 provides 20 mph as a candidate motion limit. However, if the path 602 when through 616, the evaluation path 602 provides 12 mph as the candidate motion limit.

Regarding path 604, at 630, the specialized circuitry identifies side-to-side vehicle pitch. Along these lines, the specialized circuitry may have received a set of sensor signals from the set of sensors, and determines the current side-to-side vehicle pitch from the set of sensor signals.

At 632, the specialized circuitry determines whether the current side-to-side vehicle pitch is greater than a side-to-side vehicle pitch threshold. Along these lines, the specialized circuitry may perform a comparison operation between the current side-to-side vehicle pitch and the side-to-side vehicle pitch threshold. If the current side-to-side vehicle pitch is not greater than the side-to-side vehicle pitch threshold, the specialized circuitry proceeds to 634. However, if current side-to-side vehicle pitch is greater than the side-to-side vehicle pitch threshold, the specialized circuitry proceeds to 636.

At 634, since the current side-to-side vehicle pitch is not greater than the side-to-side vehicle pitch threshold, the specialized circuitry simply identifies, as a candidate motion limit, the normal default value. Along these lines, the normal default value may be the initial or maximum motion limit in a motion limit function imposed by the specialized circuitry. For example, for speed limit control, the maximum speed limit on the speed limit curve 410 in the example of FIG. 4 is 20 mph.

At 636, since the current side-to-side vehicle pitch is greater than the side-to-side vehicle pitch threshold, the specialized circuitry selects, as a candidate motion limit, a value that is different from the normal default value. For example, for speed limit control, the new value on the speed limit curve 410 in the example of FIG. 4 may be less than 20 mph such as 10 mph.

A candidate result of evaluation path 604 is then provided to 620. In particular, if the path 604 went through 634, the evaluation path 604 provides 20 mph as a candidate motion limit. However, if the path 604 when through 636, the evaluation path 604 provides 10 mph as the candidate motion limit.

At 620, the specialized circuitry uses the lowest candidate motion limit as the current motion limit for the utility vehicle. For example, if the paths 602, 604 provided 20 mph as candidate motion limits, then the specialized circuitry identifies 20 mph as the lowest candidate motion limit. If the motor control circuitry 312 is already imposing 20 mph as the current motion limit, the specialized circuitry does not need to modify the current motion limit.

However, suppose that the motor control circuitry 312 is imposing 20 mph as the current speed limit, and path 602 provides 12 mph as the candidate speed limit and path 604 provides 10 mph as the candidate speed limit. In this situation, the specialized circuitry chooses 10 mph as the lowest candidate speed limit. Here, the 10 mph is the most conservative or safest speed limit among the candidates.

Since 10 mph is not the current speed limit imposed by the motor control circuitry 312, the specialized circuitry updates the motor control circuitry 312 with the lowest candidate speed limit of 10 mph. Accordingly, the utility vehicle imposes 10 mph as the maximum speed limit and does not operate faster than 10 mph.

After 620, the specialized circuitry proceeds back to the paths 602, 604. The specialized circuitry continues such processing in an ongoing manner. Accordingly, the utility vehicle enjoys rich and reliable grade-based vehicle motion control.

It should be understood that the procedure 600 was described above as providing grade-based speed control by way of example. The procedure 600 is similarly applicable to provide grade-based acceleration rate control, grade-based deceleration rate control, and so on.

As described above, improved techniques are directed to controlling a utility vehicle 100 in which at least one maximum motion limit is changed based on one or more current physical attributes of the utility vehicle 100 (e.g., a current front-to-back pitch or grade of the utility vehicle 100, a current side-to-side roll of the utility vehicle 100, combinations thereof, etc.). Example maximum motion limits include the utility vehicle's maximum speed limit, maximum acceleration rate, maximum deceleration rate, and the like. Such maximum motion limits may be enforced by the utility vehicle's motor controller 220. Moreover, in some arrangements, the current physical attributes of the utility vehicle 100 are sensed by a set of inertial measurement units (IMUs) of the utility vehicle's motor controller 220. By changing one or more maximum motion limits based on grade, the utility vehicle 100 may enjoy a faster maximum speed limit in certain situations for convenience (e.g., when traveling on flat terrain) and a slower maximum speed limit in other situations for safety (e.g., when traveling down or sideways on a steep hill).

While various embodiments of the present disclosure have been particularly shown and described, it will be understood by those skilled in the art that various changes in form and details may be made therein without departing from the spirit and scope of the present disclosure as defined by the appended claims.

In accordance with certain embodiments, utility vehicles enjoy IMU grade-based speed control. Examples of such utility vehicles include golf carts, personal transport vehicles, specialized vehicles, and the like which can experience selective reduction of maximum vehicle speed when the vehicle is operating on a grade. A vehicle taking direct response to its grade of operation is not thought to have been previously implemented in a golf, utility, or personal transport vehicle application.

One should appreciate that the higher a vehicle's speed, the more kinetic energy it possesses. This increases the potential for an incident to have negative consequences.

Higher speed can also mean a higher chance for an incident to occur due to the driver having less time to respond to changing conditions than they would have at an equivalent distance but a lower speed. Reducing the vehicle's allowable top speed can help limit the frequency and severity of incidents, including those resulting from loss of control. Loss of control incidents are particularly likely when a vehicle is operating on a grade, to include longitudinal traversal of an incline, lateral "side slope" travel, or a combination of the two. This is because these conditions result in uneven weight-loading of the vehicle's wheels and also because the vehicle's powertrain must work against the force of gravity in addition to the vehicle's inertia and other usual forces.

Limiting a vehicle's speed can reduce the occurrence and severity of incidents. However, limiting speed universally greatly reduces the vehicle's overall utility by making it take longer to traverse a given path.

In the golf industry, it is possible that geofences have been configured around high-grade areas to limit vehicle speed indirectly by assuming the vehicle's grade from map data. The improvements disclosed herein may be preferable to GPS-based speed control because there is no concern with latency, reliance on external hardware, or GPS inaccuracy causing unnecessary speed limitations when near but not actually in a high-grade zone.

Overall speed limitation for vehicles operating in hilly locales is another possibility for a similar end result, but as mentioned above comes with a very significant tradeoff of reducing the vehicle's utility in all situations because it takes longer to traverse equivalent distances.

If a control system on the vehicle is able to ascertain what grade the vehicle is operating on, it can respond by limiting speed when the vehicle's grade passes a certain threshold.

In some embodiments, an electric vehicle has a motor controller which contains an Inertial Measurement Unit (IMU). This IMU and its supporting software are able to estimate the vehicle's pitch, roll, angular speeds, and directional accelerations. Using this information, the controller can limit speed (or other motion features such as acceleration and/or deceleration) when the pitch and/or roll estimates exceed response setpoints.

The improvements disclosed herein may be impactful for powersport vehicles, rental services and other businesses utilizing vehicles as a form of transportation or equipment. Other industries include those for heavy turf care equipment (large mowers) and for similar systems for speed limiting, deck operation, or other responses. Other types of vehicles include hybrid vehicles, internal combustion engine vehicles, and so on. Such modifications and enhancements are intended to belong to various embodiments of the disclosure.

What is claimed is:

1. A method of controlling a utility vehicle, the method comprising:
setting a set of maximum motion limits imposed on the utility vehicle to a set of initial values;
receiving a set of input signals from a set of sensors, the set of input signals indicating a set of current physical attributes of the utility vehicle; and
based on the set of input signals, changing at least one maximum motion limit of the set of maximum motion limits from an initial value to an updated value which is different from the initial value;
wherein changing the at least one maximum motion limit includes:

comparing the set of current physical attributes indicated by the set of input signals to a set of physical attribute thresholds to obtain a first candidate motion limit value based on a first attribute comparison and a second candidate motion limit value based on a second attribute comparison, the first candidate motion limit value being different from the second candidate motion limit value, and
selecting, as the updated value, one of the first candidate motion limit value and the second candidate motion limit value based on which is lower.

2. The method of claim 1 wherein the set of maximum motion limits includes a maximum speed limit imposed on the utility vehicle;
wherein the initial value is a first maximum speed limit; and
wherein the updated value is a second maximum speed limit that is lower than the first maximum speed limit.

3. The method of claim 1 wherein the set of maximum motion limits includes a maximum acceleration rate imposed on the utility vehicle;
wherein the initial value is a first maximum acceleration rate; and
wherein the updated value is a second maximum acceleration rate that is lower than the first maximum acceleration rate.

4. The method of claim 1 wherein the set of maximum motion limits includes a maximum deceleration rate imposed on the utility vehicle;
wherein the initial value is a first maximum deceleration rate; and
wherein the updated value is a second maximum deceleration rate that is lower than the first maximum deceleration rate.

5. The method of claim 1 wherein the set of maximum motion limits includes a maximum speed limit that is initially set to a first maximum speed limit, a maximum acceleration rate that is initially set to a first maximum acceleration rate, and a maximum deceleration rate that is initially set to a first maximum deceleration rate.

6. The method of claim 1 wherein receiving the set of input signals from the set of sensors includes:
receiving a set of grade measurements from a set of grade sensors of the utility vehicle, the set of grade measurements indicating a set of current angular pitches of the utility vehicle.

7. The method of claim 6 wherein the utility vehicle includes an electric propulsion system that includes an electric motor and motor controller that controls operation of the electric motor; and
wherein receiving the set of grade measurements from the set of grade sensors includes:
acquiring a set of inertial measurement unit (IMU) signals from a set of IMUs of the motor controller while the motor controller controls operation of the electric motor.

8. The method of claim 6 wherein receiving the set of grade measurements from the set of grade sensors includes:
receiving a longitudinal grade measurement signal indicating a current amount of front-to-back pitch of the utility vehicle.

9. The method of claim 8 wherein changing the at least one maximum motion limit further includes:
in response to the current amount of front-to-back pitch indicated by the longitudinal grade measurement signal being greater than a predefined front-to-back pitch threshold, lowering at least one of a maximum speed limit, a maximum acceleration limit and a maximum deceleration limit of the utility vehicle.

10. The method of claim 6 wherein receiving the set of grade measurements from the set of grade sensors includes:

receiving a lateral grade measurement signal indicating a current amount of side-to-side roll of the utility vehicle.

11. The method of claim 10 wherein changing the at least one maximum motion limit further includes:

in response to the current amount of side-to-side roll indicated by the lateral grade measurement signal being greater than a predefined side-to-side roll threshold, lowering at least one of a maximum speed limit, a maximum acceleration limit and a maximum deceleration limit of the utility vehicle.

12. The method of claim 6 wherein receiving the set of grade measurements from the set of grade sensors includes:

receiving a longitudinal grade measurement signal indicating a current amount of front-to-back pitch of the utility vehicle, and a lateral grade measurement signal indicating a current amount of side-to-side roll of the utility vehicle.

13. The method of claim 12 wherein changing the at least one maximum motion limit further includes:

in response to the current amount of front-to-back pitch of the utility vehicle being greater than a predefined front-to-back pitch threshold, identifying a first new maximum speed for the utility vehicle, and in response to the current amount of side-to-side roll of the utility vehicle being greater than a predefined side-to-side roll threshold, identifying a second new maximum speed for the utility vehicle, and replacing an initial value for a maximum speed limit of the utility vehicle with a lower of the first new maximum speed for the utility vehicle and the second new maximum speed for the utility vehicle.

14. The method of claim 12 wherein changing the at least one maximum motion limit further includes:

in response to the current amount of front-to-back pitch of the utility vehicle being greater than a predefined front-to-back pitch threshold, identifying a first new maximum acceleration rate for the utility vehicle, and in response to the current amount of side-to-side roll of the utility vehicle being greater than a predefined side-to-side roll threshold, identifying a second new maximum acceleration rate for the utility vehicle, and replacing an initial value of a maximum acceleration rate limit of the utility vehicle with a lower of the first new maximum acceleration rate for the utility vehicle and the second new maximum acceleration rate for the utility vehicle.

15. The method of claim 12 wherein changing the at least one maximum motion limit further includes:

in response to the current amount of front-to-back pitch of the utility vehicle being greater than a predefined front-to-back pitch threshold, identifying a first new maximum deceleration rate for the utility vehicle, and in response to the current amount of side-to-side roll of the utility vehicle being greater than a predefined side-to-side roll threshold, identifying a second new maximum deceleration rate for the utility vehicle, and replacing an initial value of a maximum deceleration rate limit of the utility vehicle with a lower of the first new maximum deceleration rate for the utility vehicle and the second new maximum deceleration rate for the utility vehicle.

16. The method of claim 6, further comprising:

after changing the at least one maximum motion limit, receiving a new set of grade measurements from the set of grade sensors of the utility vehicle, the new set of grade measurements indicating a new set of current angular pitches of the utility vehicle, and based on the new set of input signals, changing the at least one maximum motion limit from updated value to another value which is different from the updated value.

17. Electronic circuitry to control a utility vehicle, the electronic circuitry comprising:

a set of sensors;

motor control circuitry constructed and arranged to operate an electric motor for vehicle propulsion; and a controller coupled with the set of sensors and the motor control circuitry, the controller being constructed and arranged to perform a method of:

setting a set of maximum motion limits imposed by the motor control circuitry on the utility vehicle to a set of initial values, receiving the set of input signals from the set of sensors, the set of input signals indicating a set of current physical attributes of the utility vehicle, and based on the set of input signals, changing at least one maximum motion limit of the set of maximum motion limits from an initial value to an updated value which is different from the initial value;

wherein changing the at least one maximum motion limit includes:

comparing the set of current physical attributes indicated by the set of input signals to a set of physical attribute thresholds to obtain a first candidate motion limit value based on a first attribute comparison and a second candidate motion limit value based on a second attribute comparison, the first candidate motion limit value being different from the second candidate motion limit value, and selecting, as the updated value, one of the first candidate motion limit value and the second candidate motion limit value based on which is lower.

18. A utility vehicle, comprising:

a battery management system (BMS) having a lithium battery;

a utility vehicle propulsion system constructed and arranged to provide utility vehicle propulsion using electric power from the lithium battery; and electronic circuitry coupled with the BMS and the utility vehicle propulsion system, the electronic circuitry being constructed and arranged to perform a method of:

setting a set of maximum motion limits imposed on the utility vehicle to a set of initial values, receiving a set of input signals from a set of sensors, the set of input signals indicating a set of current physical attributes of the utility vehicle, and based on the set of input signals, changing at least one maximum motion limit of the set of maximum motion limits from an initial value to an updated value which is different from the initial value;

wherein changing the at least one maximum motion limit includes:

comparing the set of current physical attributes indicated by the set of input signals to a set of physical attribute thresholds to obtain a first candidate motion limit value based on a first attribute comparison and a second candidate motion limit value based on a second attribute comparison, the first candidate motion limit value being different from the second candidate motion limit value, and selecting, as the updated value, one of the first candidate motion limit value and the second candidate motion limit value based on which is lower.

19. The method of claim 1 wherein the first attribute comparison is a comparison of a current front-to-back vehicle pitch attribute with a predefined front-to-back threshold;

wherein the second attribute comparison is a comparison of a current side-to-side vehicle pitch attribute with a predefined side-to-side threshold;

wherein the first candidate motion limit value and the second candidate motion limit value have the same units; and wherein selecting includes:

using a lower of the first candidate motion limit value and the second candidate motion limit value.

20. The method of claim 1 wherein comparing provides, as the first and second candidate motion limit values, multiple comparison-determined motion limit values; and wherein selecting includes:

identifying a slowest motion limit value among the multiple comparison-determined motion limit values, and using, as the updated value, the identified slowest motion limit value.

* * * * *